United States Patent [19]

Kerbow

[11] Patent Number: 5,780,552
[45] Date of Patent: Jul. 14, 1998

[54] FLUOROPOLYMERS HAVING CORE/SHELL STRUCTURE WITH FUNCTIONAL UNITS IN THE SHELL

[75] Inventor: Dewey Lynn Kerbow, Landenberg, Pa.

[73] Assignee: E. I. du Pont de Nemours and Company, Wilmington, Del.

[21] Appl. No.: 710,218

[22] Filed: Sep. 13, 1996

[51] Int. Cl.⁶ ............................................. C08F 259/08
[52] U.S. Cl. .......................... 525/276; 525/288; 525/902
[58] Field of Search ................................. 525/276, 288, 525/902

[56] References Cited

U.S. PATENT DOCUMENTS

| | | | |
|---|---|---|---|
| 3,692,569 | 9/1972 | Grot | 117/138.8 UF |
| 4,326,046 | 4/1982 | Miyaka et al. | 525/276 |
| 4,655,963 | 4/1987 | Koga et al. | 252/511 |
| 4,910,258 | 3/1990 | Inoue et al. | 525/244 |
| 4,916,020 | 4/1990 | Golding et al. | 428/421 |
| 5,294,669 | 3/1994 | Kawashima et al. | 525/129 |
| 5,447,994 | 9/1995 | Kruger et al. | 525/276 |
| 5,494,752 | 2/1996 | Shimizu et al. | 428/407 |
| 5,506,281 | 4/1996 | Muhlbauer | 523/201 |

FOREIGN PATENT DOCUMENTS

4437573-A1  6/1995  Germany.

*Primary Examiner*—Irina S. Zemel

[57] ABSTRACT

Particles of melt-fabricable fluoropolymer resin have functional units only in the particle shell.

12 Claims, No Drawings

FLUOROPOLYMERS HAVING CORE/SHELL STRUCTURE WITH FUNCTIONAL UNITS IN THE SHELL

FIELD OF THE INVENTION

This invention is in the field of melt-fabricable fluoropolymers.

BACKGROUND OF THE INVENTION

Polytetrafluoroethylene (PTFE) is known for its low surface energy and antistick properties and thermal and chemical resistance. Unfortunately, PTFE does not readily flow in molten form and thus cannot be fabricated by conventional melt-fabrication techniques, e.g. extrusion or injection molding. Melt-fabricable copolymers of tetrafluoroethylene (TFE) with at least one additional perfluorinated comonomer have been developed which possess many of the properties of PTFE but which can be melt-fabricated. As in the case of PTFE, these copolymers do not stick to other materials, especially dissimilar materials, with any practical degree of bond strength.

There are also melt-fabricable copolymers of TFE with fluorinated monomers having sulfonyl fluoride functionality. Such copolymers are formed into sheets and subsequently reacted to the acid or salt form for use as ion-conductive membranes. The amount of comonomer in these generally homogeneous copolymers is substantial in order to provide the desired ion-conductive properties. This large amount of functional comonomer substantially reduces the thermal and chemical resistance of the perfluoropolymers. Similar polymers were used by Grot in U.S. Pat. No. 3,692,569 which discloses a surface-active fluorocarbon object comprising a substrate of fluorocarbon polymer coated with a copolymer of TFE and a fluorinated monomer containing a sulfonyl group, preferably the sulfonic acid group, to render the coated fluorocarbon polymer water-wettable, printable, and cementable. These properties permit the application of dyes, inks, and cements to the surface-active fluorocarbon object at modest temperature, such as room temperature. As shown below (Comparison A), when such copolymer in the acid form is coated onto PTFE and then compression molded against an aluminum sheet, the adhesion between the copolymer and a dissimilar material, e.g., aluminum, is so weak that it cannot be tested by conventional peel strength testing, i.e. the bond has no peel strength.

Kurihara & Tatsu in German Patent Application DE 44 37 573 and Golding & Ezzell in U.S. Pat. No. 4,916,020 disclose additional melt-flowable homogeneous functional fluoropolymers useful as adhesives. In the German application, the functional fluoropolymer contains at least 2 wt % of perfluoro(vinyl ether) comonomer containing sulfonic acid or sulfonate. In the '020 patent, the functionality of the fluoropolymer is provided by sulfonic or carboxylic groups or derivatives thereof in a concentration that results in the fluoropolymer having equivalent weight that is preferably from 600 to 3000. Fluoropolymers exemplified had equivalent weights in the range 794–1142, corresponding to a functional monomer concentration of about 56–39 wt % for the polymers identified in the patent as the most commonly available polymers. In these instances, the amount of functional fluoromonomer used in the melt-flowable fluoropolymer detracts from the thermal and chemical characteristics of the fluoropolymer under use conditions.

There is a need for melt-flowable perfluoropolymer which is useful as an adhesive to dissimilar materials but which substantially retains the thermal and chemical resistance of the perfluoropolymer at normal use conditions.

SUMMARY OF THE INVENTION

The present invention satisfies the need for melt-flowable fluoropolymer with adhesive properties, but largely retaining the properties of non-functional fluoropolymers, by non-homogeneously incorporating by copolymerization small amounts of functional comonomers into the original fluoropolymer.

Specifically, this invention provides particles consisting essentially of melt-flowable fluorinated polymer, the particles having a shell of fluorinated copolymer containing copolymerized units of functional monomer. In greater detail, the preferred particle can be described as having a core of a melt-flowable first fluoropolymer consisting essentially of tetrafluoroethylene and at least one copolymerizable perfluorinated non-functional monomer, and a shell of a melt-flowable second fluoropolymer comprising tetrafluoroethylene, at least one copolymerizable non-functional perfluorinated monomer, and at least one copolymerizable functional monomer. Preferred functional monomers include functional fluorovinylethers.

The fluoropolymer particles of the present invention are non-homogeneous by virtue of their core/shell structure, as distinguished from the homogeneous (no core/shell structure) copolymers described in the Background section above.

This invention also provides articles coated with the aforesaid particles, and laminates incorporating the aforesaid particles.

DETAILED DESCRIPTION

It has been discovered that small amounts of functional comonomers can be incorporated by copolymerization to form a shell on melt-flowable fluoropolymer particles without changing the bulk physical properties of the original fluoropolymer, and yet impart surprising adhesive properties. The functional comonomer provides a shell containing polar groups to greatly increase adhesiveness to a wide variety of substrates without detracting from the physical properties of the unmodified base fluoropolymer.

A wide variety of comonomers can be used to introduce functionalities such as ester, alcohol, acid and salt and halide thereof, cyanate, carbamate, and nitrile into the shell. The choice of and amount of comonomer, and the functional group it provides, used will depend on the particular substrate to which the fluorinated polymer is to be adhered.

By way of example, omega-functional fluorinated vinyl ethers can be used to incorporate the functional group into the particle shell. These ethers retain the chemical and oxidative stability of copolymers such as copolymers of TFE with perfluoro(alkyl vinyl ether) and/or hexafluoropropylene while providing a reactive (functional) group to contact the substrate to be bonded. The fluorinated vinyl ethers having sulfonyl fluoride or carbamate functionality have been found to provide exceptional bond strengths.

By way of additional example, a small amount of a functional monomer such as $CF_2$=CF—O—$CF_2$CF($CF_3$) —O—$CF_2CF_2SO_2F$ (PDMOF), when incorporated into the shell of fluoropolymer particles converts the otherwise inert fluoropolymer to one which exhibits an unexpected increase in adhesiveness, particularly to metal. Also unexpectedly, this polymer can also adhere to other fluorine-free materials, including polymers such as nylon, polyimides and polyesters. At the same time, limiting the amount of functional monomer in the particles allows the resin to retain the basic chemical, thermal, and other desirable properties of fluoropolymers.

Most unexpectedly, such core/shell polymer particles are able to fuse with polytetrafluoroethylene (PTFE) without any surface preparation, and to provide an adherent surface on said PTFE which will allow it to be bonded to a variety of other polymeric, metallic and inorganic materials without any surface preparation.

The particles of fluoropolymer resin of this invention can be produced by polymerization processes that yield particulate product as polymerized, wherein the functional monomer is added to the polymerizing monomers toward the end of the polymerization to form polymer particles having a shell of copolymer which contains the function monomer. Such processes include dispersion and suspension polymerization, including seed polymerization processes, and are known in the art, for example, aqueous dispersion polymerization. The resin particles of this invention can be dry aggregates such as powders or pelletized resins, or can be dispersed in a liquid medium, e.g., water, as in an aqueous dispersion, and can be used in dispersion form. When produced by aqueous dispersion polymerization, the resin particles of this invention can be small, with average particle size typically in the range 10–350 nm, usually 50–250 nm. The as-polymerized (raw) dispersion may be used as discharged from the reactor if it has adequate stability and/or wetting characteristics for the intended purpose. Alternatively, the raw dispersion can be adjusted by addition of surfactants, or concentrated and stabilized by techniques well known in the art. Other materials can be blended into the particle dispersions for use in dispersion form, or such blends can be co-coagulated as a step toward dry blends or filled resins. The fluoropolymer particles of the present invention as an aqueous dispersion is another embodiment of the invention. Dispersion concentrations are typically in the range 5–40 wt % solids as polymerized, based on combined weights of solids and liquid, and can be concentrated upward to about 70 wt % solids. Either raw or concentrated dispersion can be diluted to a lower concentration as desired for use.

Alternatively, traditional techniques known in the art (see U.S. Pat. No. 5,266,639, for example) can be used to recover the fluoropolymer particles of this invention from the aqueous polymerization medium. For example, such methods as coagulation by vigorous agitation, optionally with added electrolyte, or by freezing and thawing, followed by separation of the wet solids from the liquid and then by drying can be used.

In making the particles of this invention, the polymerization process is carried out so as to form a core/shell particle structure, wherein the shell of the particle is distinguished from the core of the particle at least by the presence in the shell of a concentration of functional comonomer that is not present in the core. Preferably, there is no functional comonomer in the core, since functional comonomer can detract from the chemical and/or thermal properties of the fluorinated polymer, such as by reducing compatibility with non-functional fluoropolymer, and is costly. There can be other differences between core and shell, for example, a molecular weight difference or a difference in polymer composition aside from the presence of functional monomer. Furthermore, the core and/or the shell can vary in composition and/or molecular weight. Such variations can be sharply defined, so that the particle can have a multiplicity of discrete layers, or the radial variations can be gradual. However, for purposes of the present invention, the core/shell interface is considered to be the boundary between polymer preferably containing no functional monomer and polymer containing functional monomer. Thus, the particle can be described as having a core of a first fluoropolymer and a shell of a second fluoropolymer, with first and second fluoropolymers distinguished at least by the presence in the shell of units of units derived from functional monomer. Generally, the shell is no more than 25% of the particle by weight, and can be substantially less, for example, 10% or 5%. When the fluoropolymers of the core and the shell are both TFE polymers, the core and shell fractions of the particle are defined by the weight of TFE consumed, respectively, before and after the functional monomer is introduced.

Functional monomers are monomers that, when incorporated into the second fluoropolymer (the shell) of the particles of this invention, introduce into the second fluoropolymer pendant side groups containing functional units capable of chemical activity within the processing temperature range of the first fluoropolymer. By "chemical activity" it is meant that the functional unit has the capability to interact with other material to achieve an adhesive bond. Base fluoropolymer, i.e., fluoropolymer without copolymerized functional comonomer, does not have appreciable chemical activity under melt conditions. Usually, but not necessarily, such functional units are at the ends of the pendant side groups. Examples of such functionality include ester, alcohol, acid (including carbon-, sulfur-, and phosphorus-based acid) and salt and halide thereof. Other functionalities include cyanate, carbamate, nitrile, and the like.

Functional monomers that introduce pendant side groups having such functionality can have the general formula $CY_1Y_2$=$CY_3$—Z wherein each Y is independently H, F, or Cl and Z contains a functional group. Preferably, each Y is F and —Z is —$R_f$—X, wherein $R_f$ is a fluorinated diradical and X is a functional group that may contain $CH_2$ groups. Preferably, $R_f$ is linear or branched perfluoroalkoxy having 2–20 carbon atoms, so that the functional comonomer is a fluorinated vinyl ether. Examples of such fluorovinylethers include $CF_2$=$CF[OCF_2CF(CF_3)]_m$—O—$(CF_2)_n CH_2 OH$ as disclosed in U.S. Pat. No. 4,982,009 and the alcoholic ester $CF_2$=$CF[OCF_2CF(CF_3)]m$—O—$(CF_2)_n$—$(CH_2)_p$—O—COR as disclosed in U.S. Pat. No. 5,310,838. Additional fluorovinylethers include $CF_2$=$CF[OCF_2CF(CF_3)]_m O(CF_2)_n COOH$ and its carboxylic ester $CF_2$=$CF|OCF_2CF(CF_3)]_m O(CF_2)_n COOR$ disclosed in U.S. Pat. No. 4,138,426. In these formulae, m=0–3, n=1–4, p=1–2 and R is methyl or ethyl. Preferred such fluorovinylethers include $CF_2$=$CF$—O—$CF_2CF_2$—$SO_2F$; $CF_2$=$CF[OCF_2CF(CF_3)]O(CF_2)_2$—Y wherein —Y is —$SO_2F$, —CN, or —COOH; and $CF_2$=$CF[OCF_2CF(CF_3)]O(CF_2)_2$—$CH_2$—Z wherein —Z is —OH, —OCN, —O—(CO)—$NH_2$, or —OP(O)(OH)$_2$. These fluorovinylethers are preferred because of their ability to incorporate into the polymer and their ability to incorporate functionality into the resultant copolymer.

Compounds having the formula $CF_2$=$CF$—$R_f$—$(CH_2)_n$—X in which X is —OCN (cyanate), —O—(CO)—$NH_2$ (carbamate), or —OP(O)(OH)$_2$ (phosphono) can be synthesized as follows. The cyanate can be prepared in high yield by a one-step process in which known compounds having the general formula $CF_2$=$CF$—$R_f$—$(CH_2)_n$—OH (I), wherein n is 1–3 and $R_f$ is perfluorolkyl or perfluoroalkoxy containing 1–20 carbon atoms, are reacted with cyanogen bromide (CNBr) or cyanogen chloride (CNCl) in the presence of non-nucleophilic base. The carbamate can be prepared from the cyanate by contacting cyanate with acid at elevated temperature for time sufficient to complete conversion of cyanate to carbamate. The phosphorus-containing compounds can be prepared in high yield by a process in which compounds (I) are reacted with P(O)Cl$_3$ or P(O)Br$_3$, either neat or in aprotic solvent, to obtain the chloride or bromide, e.g., CF$_2$=CF—R$_f$—(CH$_2$)$_n$—OP(O) (Cl$_2$), followed by hydrolysis to obtain the acid —OP(O)—(OH)$_2$. Specific conditions are disclosed in Monomer Preparations 1–4 below.

The amount of functional monomer in the fluoropolymer particles of this invention is small. Generally, the amount of functional monomer in the particle is no more than 5 wt %, preferably no more than 3 wt %, based on total weight of fluoropolymer. When the functional monomer has sulfonyl functionality, it is desirable for the amount of functional monomer to be no more than 1 wt %, especially no more than 0.5 wt %. The amount of functional monomer can be as low as 0.01 wt %, and even less depending on the stage at which the functional monomer is introduced into polymerization. The shell containing the functional monomer is preferably no more than 25% of the particle, based on TFE consumed in polymerization, and can be substantially less, for example, as little as 10%, or even 5%, of the particle. It is not necessary to have a uniform concentration of functional monomer throughout the shell. Generally, it is preferred for functional monomer concentration to be highest at the particle surface. This can be achieved, for example, by starting addition of functional monomer at a selected point in the polymerization batch and continuing addition to the end of polymerization.

Fluoropolymers in the core and shell of particles of this invention are copolymers of TFE and at least one fluorinated comonomer other than a functional monomer, the shell additionally containing copolymerized functional monomer. Preferred non-functional fluorinated comonomers include perfluoroolefins having 3–8 carbon atoms and perfluoro (alkyl vinyl ethers) (PAVE) in which the alkyl group has 1–5 carbon atoms. Hexafluoropropylene (HFP), perfluoro (methyl vinyl ether) (PMVE), perfluoro(ethyl vinyl ether) (PEVE), and perfluoro(propyl vinyl ether) (PPVE) are especially preferred. The amount of non-functional comonomer is sufficient to reduce the melting point of the fluoropolymer substantially below that of TFE homopolymer.

The fluoropolymers consitituting the particles of this invention are melt-flowable, and would be melt-flowable even without functional monomer present. As such, they generally have melt viscosity (MV) of no more than 10$^5$ Pa·s. For convenient use as an adhesive, MV is desirably in the range 0.01–20×10$^3$ Pa·s, especially in the range 0.1–10× 10$^3$ Pa·s.

A wide variety of articles can be derived from the core/shell particles of this invention. For example, the fluoropolymer particles of the invention are well suited for use in conjunction with materials of composition unlike the fluoropolymer. Because of the change of surface characteristics due to functional monomer in the particle shell, the fluoropolymer particle is compatible with unlike materials to be able to bond to them. Still, the fluoropolymer particle retains sufficient base fluoropolymer character to be compatible with base fluoropolymer and similar fluoropolymers. Thus, the fluoropolymer particle can be bonded to another material, either the functional entity of said particle being compatible with said material or the fluoropolymer portion of said particle being compatible with said material. This makes the core/shell fluoropolymer particle useful to enhance interfacial interaction between dissimilar materials, one of which is ordinarily base fluoropolymer or compatible with base fluoropolymer and similar fluoropolymers. The fluoropolymer particles can be used, for example, as an adhesive interlayer (or priming layer) in forming laminates of base fluoropolymer and unlike material such as other polymer or metal, and such use is within the scope of the inventon. Thus, this invention provides a convenient way to achieve a strong bond between such dissimilar materials without undesirable modification of the bulk characteristics of one or both materials or without cumbersome and expensive treatments of intermediate structural components. The process for such bonding comprises bringing fluoropolymer particles of the invention and another material together, in contact with one another, and heating the resultant assemblage of said material and said powder or melt mixture thereof to cause said material and said fluoropolymer to bond together. Under the application of heat, dual compatibility of the fluoropolymer particles enables the fluoropolymer of the particles to fuse with, or to wet and thus bond to, other material that is compatible with base fluoropolymer of the powder, and the functional portion of the particles to fuse with, or to wet and thus bond to, other material that is compatible with the functional portion of the particle.

As one skilled in the art will recognize, fluoropolymer particles of this invention can be used in many ways. Particles or particle aggregates, for example, can be sprinkled or dusted into place, can be applied to a surface from a dispersion or slurry, can be mixed with other powder or liquid as a binder or for other purposes, or can be distributed on a surface by one of several powder coating techniques such as electrostatic spraying or fluidized bed coating. Normally, the particles will be fused in place by heating the powder above the melting temperature of the base fluoropolymer of the particles, commonly with the application of pressure to create intimacy of contact between the particles and the surface of other material to be bonded to the fluoropolymer particles. While the fluoropolymer particles may be used to create a free surface, there is particular value in using it as an intermediate between two other materials, one of which advantageously can be of base fluoropolymer. Thus, deposition of fluoropolymer particles at an interface between two other materials can be achieved in closely coupled operations or in operations separated both in time and place. For example, the fluoropolymer particles can be deposited on the surface of one material, followed by placement of a second material, followed by a single heating step. Alternatively, the particles can be attached to one material, and then mated with a second material at a different time in a different place. Various such combinations of steps will readily occur to one skilled in the art.

EXAMPLES

Unless otherwise stated,melt flow rate (MFR) was measured at 372° C. by the method of ASTM D-1238-52T modified as described in U.S. Pat. No. 4,380,618. MFR is related to melt viscosity (MV) by the relationship MV=53.15/MFR, when MFR is in units of g/10 min and MV is in units of 10$^3$ Pa·s.

Thermal characteristics of fluoropolymer resins were determined by DSC by the method of ASTM D-4591-87. The melting temperature reported is the peak temperature of the melting endotherm.

Average size of polymer particles as polymerized, i.e., raw dispersion particle size (RDPS), was measured by photon correlation spectroscopy.

Fluoropolymer compositions were determined on 0.095–0.105 mm thick films, using Fourier transform infrared spectroscopy. For HFP determination, the method described in U.S. Pat. No. 4,380,618 was used. In general, the content of units derived from various monomers in the fluoropolymers was determined by infrared spectroscopy calibrated by $^{19}$F NMR at high temperature, using the infrared bands and conversion factors given in Table 2. The content of a specific monomer in wt % was calculated as the ratio of the absorbance characteristic of that monomer at the approximate frequency given in the second column of the table to the absorbance at about 2365 cm–1 (internal thickness band near 4.25 μm), multiplied by the factor given in the third column of the table. For functional monomers not listed in Table 2, concentrations were determined by $^{19}$F NMR at high temperature.

Acronyms or abbreviations for various monomers, both functional and non-functional, used in the following examples are defined in Table 1.

TABLE 1

Monomer Identification

| Code | Identification or Description |
| --- | --- |
| TFE | tetrafluoroethylene |
| HFP | hexafluoropropylene |
| PMVE | perfluoro(methyl vinyl ether) |
| PEVE | perfluoro(ethyl vinyl ether) |
| PPVE | perfluoro(propyl vinyl ether) |
| PDMOF | $CF_2=CF—[OCF_2CF(CF_3)]—O—CF_2CF_2—SO_2F$ 8-fluorosulfonyl-perfluoro(3,6-dioxa-5-methyl-1-octene) |
| EVE-OH | $CF_2=CF—[OCF_2CF(CF_3)]—O—CF_2CF_2—CH_2—OH$ 9,9-dihydro-9-hydroxy-perfluoro(3,6-dioxa-5-methyl-1-nonene) |
| EVE-OCN | $CF_2=CF—[OCF_2CF(CF_3)]—O—CF_2CF_2—CH_2—OCN$ 9-cyanato-9,9-dihydro-perfluoro(3,6-dioxa-5-methyl-1-nonene) |
| EVE-carbamate | $CF_2=CF—[OCF_2CF(CF_3)]—O—CF_2CF_2—CH_2—O—(CO)—NH_2$ 9-carbamate-9,9-dihydro-perfluoro(3,6-dioxa-5-methyl-1-nonene) |
| EVE-P | $CF_2=CF-[OCF_2CF(CF_3)]—O—CF_2CF_2—CH_2—OP(O)(OH)_2$ 9-phosphono-9,9-dihydro-perfluoro(3,6-dioxa-5-methyl-1-nonene) |
| 8-CNVE | $CF_2=CF—[OCF_2CF(CF_3)]—O—CF_2CF_2—CN$ 8-cyano-perfluoro(3,6-dioxa-5-methyl-1-octene) |
| EVE-COOH | $CF_2=CF—[OCF_2CF(CF_3)]—O—CF_2CF_2—COOH$ 8-carboxyl-perfluoro(3,6-dioxa-5-methyl-1-octene) |

TABLE 2

IR Factors for Functional Units

| Monomer | Frequency (cm$^{-1}$) | Factor |
| --- | --- | --- |
| HFP | 983 | 3.2 |
| PMVE | 890 | 7.0 |
| PEVE | 1090 | 1.33 |
| PPVE | 995 | 0.94 |
| PDMOF | 1795 | 1.33 |
| EVE-OH | 2954 | 620 |
| EVE-carbamate | 1763 | 1.58 |
| EVE-COOH | 1773 | 1.88 |

Example 1

TFE/PEVE Copolymer with PDMOF in Shell

In a horizontal 1-gal (3.8-L) autoclave, equipped with a paddle agitator, 2350 mL of demineralized water were deareated by evacuation and purging with nitrogen. While under vacuum, 26 mL of a 20 wt % solution of the ammonium salt of perfluorooctanoic acid (C-8) in water, 60 mL of PEVE, and 4 mL of chloroform were added. The temperature was increased to 80° C. and the pressure was increased to 300 psig (2.17 MPa) by addition of TFE. An initial charge of 40 mL of a 2 g/L solution of ammonium persulfate (APS) in water was added. At kickoff, as determined by a 5 psi (0.03 MPa) pressure drop, TFE addition was begun to maintain pressure at 300 psig, and feeds of 1 mL/min of PEVE and 2 mL/min of the initiator solution were begun. When 680 g of TFE had been added to the reactor after kickoff, the PEVE addition was stopped and a feed of 0.5 mL/min of the functional monomer PDMOF was begun. After about 900 g of TFE had been added after kickoff, all feeds were stopped, the autoclave was vented and the product dispersion was collected. Solids content of the dispersion was 26.6 wt %. An aliquot of the dispersion was diluted with an equal volume of demineralized water and shear coagulated in a Waring blender. The wet resin was rinsed three times with demineralized water, and dried at 150° C. The product resin contained 9.0 wt % of PEVE and 0.22 wt % of PDMOF, as determined by Fourier transform infrared (FTIR) spectroscopy which had been calibrated by $^{19}$F NMR. The MFR was 117 g/10 min. Melting point was 295.9° C.

A portion of the powder solids was suspended in isopropanol to form a thin slurry (5 g in 15 mL alcohol). The slurry was coated onto an aluminum sheet using a #24 wire-wound rod (R. D. Specialties, Inc.) and the alcohol allowed to air dry. Average coating density was determined to be about 2.2 mg/cm$^2$. Pellets of a TFE/PPVE copolymer resin that has been chemically modified to enhance purity and improve thermal stability (Teflon® PFA fluoropolymer resin grade 440 HP, DuPont) were placed on the coating in a 0.010-inch (0.25-mm) thick and 6-inch (15.2-cm) square chase having a 4-inch (10.2-cm) square opening and another aluminum sheet was placed on top of the construction. The sandwich was compression molded in a laboratory press at 350° C. in an 8-min cycle (3 min at platten contact, 2 min to increase ram force to 5000 lb {2273 kg}, and 3 min at 5000 lb), removed from the press and quenched in ice water.

The aluminum sheet on the 440 HP side of the construction easily peeled from the resin surface, indicating zero peel strength. The side treated with powder of the invention remained adhered to the aluminum. A 1-inch (2.54-cm) wide strip of this adhered side was cut and subjected to peel testing in an Instron tensile tester. Average peel strength was 310 g/cm, showing the enhanced adhesion of the polymer particles of this invention, despite the low concentration (0.22 wt %) of PDMOF.

Example 2

Dried copolymer powder from Example 1 was suspended in isopropanol as before and coated using a 0.152-mm (6-mil) draw knife onto a sheet of sintered polytetrafluoroethylene (PTFE) of 0.05 mm (2 mil) thickness. After air drying to remove the isopropanol, the coated PTFE was placed into an air oven at 380° C. for 30 min. The resulting coating density was 1.6 mg/cm$^2$.

The side of the PTFE sheet primed with the copolymer particles was placed in contact with a clean aluminum plate and the construction was placed in a heated platen press at 320° C. for 1 min to preheat, 3 min at 5000 lb (2270 kg) and then 1 min at 20,000 lb (9090 kg) force to bond the PTFE to the aluminum, with the press load applied to an area of 4 inch×8 inch (10.2 cm×20.3 cm). The laminate was then removed to a room temperature press where it was held at 5000 lb force for 1 min to cool. Average peel strength was 500 g/cm of width. A similar but unprimed PTFE sheet showed no detectable adhesion to aluminum under the same molding conditions.

A second laminate prepared as above was placed in boiling water for 2 hr. After this exposure, the laminate had a peel strength of 214 g/cm, demonstrating good retention of adhesive bonds formed using core/shell polymer particles of this invention.

Comparison A

A commercially available solution of TFE/PDMOF copolymer which has been hydrolyzed to the sulfonic acid form and having equivalent weight of about 1100 (Nafion® solution NR-005, DuPont Company, nominal 5 wt % solids) was coated onto a 2 mil thick sintered PTFE sheet using a draw knife to deliver a 0.006 inch (0.15 mm) thick solution coating. This copolymer would have a PDMOF content of about 40 wt %. See U.S. Pat. No. 4,433,082. The solvents in the solution were allowed to air dry and the coated sheet was placed into an air oven at 380° C. for 30 min as in Example 2. The primed side of the sheet was compression molded against an aluminum sheet as above. An attempt at peel testing showed no measurable adhesion, in that the PTFE film peeled from the aluminum surface while a strip of laminate was being inserted into the clamping jaws of the tensile tester. Thus, despite a concentration of PDMOF substantially higher than in the core/shell copolymer particle of Example 1, adhesion is deficient relative to that of Example 1.

Comparison B

A slurry of TFE/PDMOF copolymer resin, the precursor to the hydrolyzed resin of the NR-005 solution in Comparison A, in 1,1,2-trichloro-1,2,2-trifluoroethane (CFC-113) was coated onto untreated aluminum sheet and the CFC-113 was allowed to evaporate. To remove residual solvent, the powder-coated sheet was dried for 15 min at 100 degC. A laminate was prepared and press molded as in Example 1. Upon cooling, the PFA 440 HP layer peeled easily from both the untreated aluminum and the powder-coated aluminum, indicating no measurable adhesion despite the high concentration of PDMOF in the TFE/PDMOF copolymer.

Comparison C

A laminate was prepared generally as in Example 1, except that no adhesive layer was coated onto the aluminum sheet and a TFE/PPVE copolymer resin that had not been chemically modified (Teflon® PFA fluoropolymer resin grade 340, DuPont) was used instead of the PFA 440 HP resin, this TFE/PPVE resin having the best chance of sticking to the aluminum. Peel force was only 35 g/cm, which further indicates that the level of adhesion obtained with the fluorinated copolymer particles of the invention is due to the copolymerized functional monomer in the shell.

Example 3

TFE/HFP Copolymer with PDMOF in Shell

In the autoclave of Example 1, 2250 mL of demineralized water were deareated by evacuation and purging with nitrogen. While under vacuum, 20 mL of a 20 wt % solution of C-8 in water and 8 mL of chloroform were added. The temperature was increased to 95° C. and the pressure was increased to 450 psig (3.2 MPa) by addition of HFP. Then pressure was further increased to 650 psig (4.6 MPa) with TFE. An initial charge of 60 mL of a 5 g/L aqueous solution of APS was added. At kickoff, TFE addition was begun to maintain pressure at 650 psig and a feed of 2 mL/min of the same initiator solution was begun. After 1.5 lb (0.63 kg) of TFE were added to the autoclave after kickoff, a feed of 5 mL/min of PDMOF was begun. After 2 lb (0.91 kg) of TFE had been added after kickoff, all feeds were stopped and the reactor pressure was allowed to drop to 550 psig (3.9 MPa). The autoclave was then vented and the dispersion was collected. Solids content of the resulting dispersion was 26.6 wt %. An aliquot of the dispersion was shear coagulated in a Waring blender, rinsed with demineralized water, and dried at 150° C. Analysis by FTIR, which had been calibrated by NMR, showed the resin produced contained 13.8 wt % of HFP and 0.51 wt % of PDMOF. The melt flow rate at 372° C. was 38 g/10 min. A laminate was prepared as in Example 2. Peel strength was 160 g/cm, despite the low concentration of PDMOF in the resin.

Example 4

TFE/PMVE copolymer with PDMOF in Shell

In the same autoclave as above, 2100 mL of demineralized water were deareated by evacuation and purging with nitrogen. While under vacuum, 12 g of a 33 wt % solution of a mixture of $C_6$-$C_{16}$ perfluoroalkyl ethane sulfonic acids (Zonyl® TBS fluorochemical surfactant, DuPont Company) in water and 1 mL of chloroform were added. Temperature was increased to 80° C. and 120 mL of PMVE were added by a piston displacement pump. Pressure was increased to 350 psig (2.5 MPa) with TFE. An initial charge of 50 mL of a 5 g/L solution of APS was added. At kickoff, addition of PMVE was begun at 1 mL/min, and TFE addition was begun to maintain pressure at 350 psig. A feed of 0.75 mL/min of the same initiator solution was also begun. After 1.5 lb (0.68 kg) pounds of TFE were added to the recipe after kickoff, a feed of 5 mL/min of PDMOF was begun. After 2 lb (0.91 kg) of TFE were added after kickoff, all feeds were stopped, the autoclave was vented, and the dispersion was collected. Solids content of the collected dispersion was 19.5 wt %. An aliquot of the dispersion was coagulated by freezing, rinsed three times with demineralized water, and dried at 50° C. in a vacuum oven. Analysis by FTIR showed that the resin contained 10.9 wt % of PMVE and 2.9 wt % of PDMOF. The melt flow rate was 24.1 g/10 min. Melting point, as measured by DSC, was about 265° C. A laminate was prepared as in Example 2. Peel strength was 200 g/cm.

Example 5

TFE/PMVE Copolymer with EVE-OH in Shell

The polymerization procedure of Example 4 was essentially followed, except that the charge of demineralized water was 2000 mL, the feed of PMVE was stopped after 340 g of TFE had been added after kickoff and a feed of 1 mL/min of EVE-OH was started at this point in place of the PDMOF feed, and the total amount of TFE added (after kickoff) was 454 g. Solids content of the resulting dispersion was 17.1 wt %. To coagulate the dispersion, an aliquot was placed in freezer overnight. The frozen aliquot was thawed by a warm demineralized water rinse into a Bucherer funnel fitted with a No. 40 Whatman filter paper. The coagulated polymer was rinsed and filtered three times to remove inorganic residues and then dried overnight at 100° C. Analysis by FTIR, which had been calibrated by NMR, showed that the core/shell copolymer contained 26.9 wt % of PMVE and 3.1 wt % of EVE-OH. The melt flow rate at 372° C. was 0.5 g/10 min. DSC analysis showed no evidence of a melting point. The freeze coagulation yielded a coarse powder which was sieved to isolate a fraction that passed through a 40-mesh screen (<420 μm particle size). This fraction was dusted onto an aluminum sheet so as to provide a uniform monolayer of powder, i.e., a layer one particle thick. A laminate was constructed and molded as in Example 1. Peel strength (PFA 440 HP to powder-coated aluminum) was 300 g/cm, showing the good adhesion obtained with the core/shell particle of this invention having functional units only in the shell.

Monomer Preparation 1

$CF_2=CFO-CF_2CF(CF_3)O-CF_2CF_2-CH_2-OCN$

To a pre-dried flask were charged EVE-OH (39.4 g, 0.10 mol) and cyanogen bromide (11.13 g, 0.105 mol) in acetone solvent (60 mL) with vigorous stirring. Triethylamine (11.11 g, 0.11 mol) was added slowly into the above solution. The reaction temperature was kept at around 0° C. by external cooling. After the addition was complete, the reaction mixture was stirred at 0° C. for 15 to 30 min, then was dumped into ice water. The bottom organic layer was separated, washed with water and distilled to give a clear, colorless liquid having a boiling point of 47° C. at 0.7 mmHg, and identified by infrared spectroscopy and $^{19}F$ NMR as 9-cyanato-9,9-dihydroperfluoro-(3,6-dioxa-5-methyl-1-nonene) (EVE-OCN, formula above). Yield was 26 g (62%).

Monomer Preparation 2

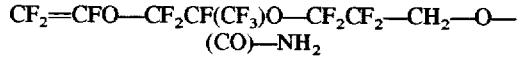
$CF_2=CFO-CF_2CF(CF_3)O-CF_2CF_2-CH_2-O-(CO)-NH_2$

EVE-OCN (30 g, 0.0716 mole) was mixed with 8 mL of 6N HCl and was stirred for 6 hr at ambient temperature. The temperature was then raised to 50° C. and after 2 hr the conversion of the starting material was complete. The bottom organic layer was separated, washed with water, and distilled to give 20.6 g (65.8% yield) of EVE-carbamate, formula above, as a clear, colorless liquid having a boiling point of 80°–84° C. at 2 mmHg. The EVE-carbamate structure was confirmed by $^{19}F$ and proton NMR and IR.

Example 6

TFE/PEVE Copolymer with EVE-OCN in Shell

A 1-gal autoclave was charged with 2300 mL of demineralized water which were deareated as before. While under vacuum, 25 g of a 20 wt % solution of C-8, 17 mL of PEVE and 1 g of ethane were added. The temperature was increased to 80° C. and the pressure was increased to 300 psig (2.17 MPa) by addition of TFE. An initial initiator charge of 60 mL of a 2 g/L aqueous solution of APS was added. At kickoff, as determined by a 5 psi (0.03 MPa) pressure drop, a feed of a mixture of TFE and PEVE in the ratio TFE:PEVE=97.1:2.9 by weight was begun to maintain pressure at 300 psig. Also, an addition of 0.5 mL/min of the same initiator solution was begun and was continued throughout the polymerization. When 600 g of TFE/PEVE mixture had been added after kickoff, 10 mL of EVE-OCN were added. After 650 g of TFE/PEVE mixture had been added after kickoff, all feeds were stopped and the pressure was allowed to drop to 150 psig (1.1 MPa). The reactor was vented and cooled, and the product dispersion was collected. Solids content of the dispersion was 22.2 wt %. The dispersion was coagulated and the copolymer resin was isolated essentially as in Example 1. The dried product resin contained 2.44 wt % PEVE and 0.83 wt % of units derived from EVE-OCN but present with carbamate functionality, as determined by FTIR spectroscopy. I.e., under these polymerization conditions, all detectable —OCN was converted to —O—(CO)—NH$_2$. The melt flow rate, as measured at 372° C. with a 1060 g weight, was 11.5 g/10 min. Melting point was 309° C. as measured by DSC. Using a portion of the powder solids, a laminate was prepared as in Example 1 except than an 8-mil (0.2-mm) draw bar was used instead of the wire wound rod. Again, the aluminum sheet on the 440 HP side of the construction easily peeled from the resin surface while the powder treated side remained adhered to the aluminum. Average peel strength was 2.0 lb/inch (360 g/cm), showing the enhanced adhesion of the polymer of this invention.

Monomer Preparation 3

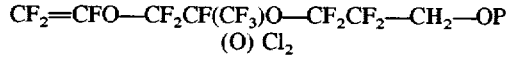
$CF_2=CFO-CF_2CF(CF_3)O-CF_2CF_2-CH_2-OP(O)Cl_2$

A pre-dried flask was charged with EVE-OH (257 g, 0.652 mol), phosphoryl chloride (500 g, 3.257 mol) and anhydorus calcium chloride (3.6 g, 0.0324 mol). This reaction mixture was heated at 110° C. for 6–8 hr or until the EVE-OH starting material was consumed. The excess phosphoryl chloride was recovered by distillation at normal pressure. The residual liquid was then distilled under reduced pressure to give 9-phosphonochloride-9,9-dihydroperfluoro(3,6-dioxa-5-methyl-1-nonene) (EVE-P-chloride, formula above) product as a clear, colorless liquid having a boiling point of 85°–90° C. at 5 mmHg (or 67°–72° C. at 2 mmHg). Yield: 200 g (60%).

Monomer Preparation 4

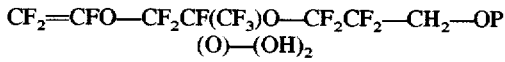
$CF_2=CFO-CF_2CF(CF_3)O-CF_2CF_2-CH_2-OP(O)-(OH)_2$

A round bottom flask was charged with 700 g (1.37 mol) of EVE-P-chloride and water (49.4 g, 2.75 mol) was slowly added. After all the water was added, the reaction mixture was stirred vigorously at ambient temperature overnight, then placed under high vacuum at 60° C. to remove any residual water and to give 9-phosphono-9,9-dihydro-perfluoro(3,6-dioxa-5-methyl-1-nonene) (EVE-P, formula above) product as a clear, viscous liquid (640 g,98.6- yield).

Example 7

TFE/PEVE Copolymer with EVE-P in Shell

The polymerization procedure of Example 6 was essentially followed, except that the precharge of demineralized water was 2100 mL and 10 mL of EVE-P in 300 mL of demineralized water were used instead of the EVE-OCN. Solids content of the resulting dispersion was 22.5 wt %. An aliquot of the dispersion was placed into a freezer and allowed to freeze solid overnight. Upon thawing, the resulting suspension was filtered through Whatman 541 paper on a Bucherer funnel and washed three times with demineralized water. The solids were then dried overnight at 100° C. Melting point was determined to be 313° C. by DSC. Analysis by FTIR, which had been calibrated by NMR, showed that the copolymer resin contained 1.97 wt % of PEVE and 0.23 wt % of EVE-P. The melt flow rate was 12 g/10 min. A laminate prepared using this powder according to the procedure of Example 5 gave a peel strength of 270 g/cm.

Example 8

TFE/PEVE Copolymer with EVE-Carbamate in Shell

The polymerization procedure of Example 6 was essentially repeated, except that EVE-carbamate was used as the functional monomer instead of the EVE-OCN, and the amount was 9.6 mL instead of 10 mL. Solids content of the dispersion was 20.3 wt %. Polymer isolation was by freeze coagulation as in Example 7. The dried product resin contained 6.65 wt % of PEVE and 1.07 wt % of units derived from EVE-carbamate. Melting point was 289° C. The copolymer resin powder was used to produce a laminate as in Example 1 which gave a peel strength of 480 g/cm.

Example 9

TFE/PEVE Copolymer with 8-CNVE in Shell

The procedures of Example 6 were essentially repeated, except that 8-CNVE was used as the functional monomer instead of the EVE-OCN. Solids content of the dispersion was 21.9 wt %. The dried product resin contained 2.63 wt % of PEVE and 0.50 wt % of units derived from 8-CNVE. Melting point was 308° C. The copolymer resin powder was used to produce a laminate which gave a peel strength of 355 g/cm.

Example 10

TFE/PEVE Copolymer with EVE-COOH in Shell

The polymerization procedure of Example 6 was essentially repeated, except that EVE-COOH was used as the functional monomer instead of the EVE-OCN. Solids content of the dispersion was 22.4 wt %. Polymer solids were isolated by shear coagulation with addition of enough nitric acid to produce a clear mother liquor. The dried product resin contained 5.95 wt % of PEVE and 1.94 wt % of units derived from EVE-COOH. The copolymer resin powder was used to produce a laminate as in Example 6 which gave a peel strength of 260 g/cm.

What is claimed is:

1. Particles consisting essentially of melt-flowable fluorinated polymer, said particles having a shell of fluorinated copolymer containing copolymerized units of polar functional monomer, said particles having a melt flowable fluoropolymer core.

2. Particles of fluorinated polymer, said particles having a core of a melt-flowable first fluoropolymer consisting essentially of tetrafluoroethylene and at least one copolymerizable fluorinated non-functional monomer, and a shell of a melt-flowable second fluoropolymer comprising tetrafluoroethylene, at least one copolymerizable non-functional fluorinated monomer, and at least one copolymerizable polar functional monomer.

3. The particles of claim 2, wherein said functional monomer has alcohol, acid and salt and halide thereof, cyanate, carbamate, or nitrile functionality.

4. The particles of claim 3, wherein said acid is carbon-based, sulfur-based, or phosphorous-based.

5. The particles of claim 3, wherein said functional monomer is functional fluorovinylether.

6. The fluorinated polymer particles of claim 1 as an aqueous dispersion.

7. An article derived from the fluorinated polymer particles of claim 1.

8. The particles of claim 1, wherein said monomer has the formula $CY_1Y_2=CY_3-Z$, wherein each Y is independently H, F, or Cl, and Z is the functional group which is polar.

9. The particles of claim 1, wherein each Y is F.

10. The particles of claim 1 wherein said functional monomer increases the capability of said fluorinated polymer to interact with other materials to achieve adhesive bond.

11. The particles of claim 1 wherein the melt flowability of said fluorinated copolymer is characterized by said fluorinated copolymer having a melt viscosity of no more than $10^5$ Pa·s.

12. A process for bonding the melt-flowable fluorinated polymer particles of claim 1 to another material, comprising bringing said particles and said material together, in contact with one another, either the functional portion of said particles being compatible with said material or the fluoropolymer portion of said particles being compatible with said material, and heating the resultant assemblage of said material and said particles to cause said material and said fluorinated polymer particles to bond together.

* * * * *